July 7, 1964 — P. R. LUERTZING — 3,140,097
JOINTS FOR LABORATORY APPARATUS
Filed April 6, 1962

INVENTOR
Paul R. Luertzing
BY
Pennie Edmonds Morton Barrows Taylor
ATTORNEYS

United States Patent Office 3,140,097
Patented July 7, 1964

3,140,097
JOINTS FOR LABORATORY APPARATUS
Paul R. Luertzing, Vineland, N.J., assignor to Lurex Manufacturing Company, Vineland, N.J., a corporation of New Jersey
Filed Apr. 6, 1962, Ser. No. 185,722
5 Claims. (Cl. 277—168)

This invention relates to laboratory apparatus and is concerned more particularly with novel joints for use in such apparatus, which form tight seals and may be easily assembled and taken apart.

The apparatus used in laboratories is commonly formed of elements of glass or metal connected together by joints which can be put together and taken apart as the apparatus is erected and dismantled. In one form, such joints comprise a male and a female member having respective external and internal co-operating surfaces which are ground with a mating taper. In another type of joint, the members are of ball and socket form and the ground mating surfaces are of spherical curvature. When the ground surfaces of the members of either form of joint are placed in close contact, the irregularities of the surfaces interlock so that a sealing action is provided. While the use of such ground surfaces produces joints sufficiently tight for some purposes, these joints are not adequately sealed for high vacuum operations.

The present invention is, accordingly, directed to the provision of joints of the type described which provide a seal capable of withstanding a relatively high vacuum and can be easily assembled and disassembled. The new joints are inexpensive to make and the parts are not subject to wear as the joints are put together and taken apart.

For a better understanding of the invention, reference may be made to the accompanying drawing, in which—

Figure 1:
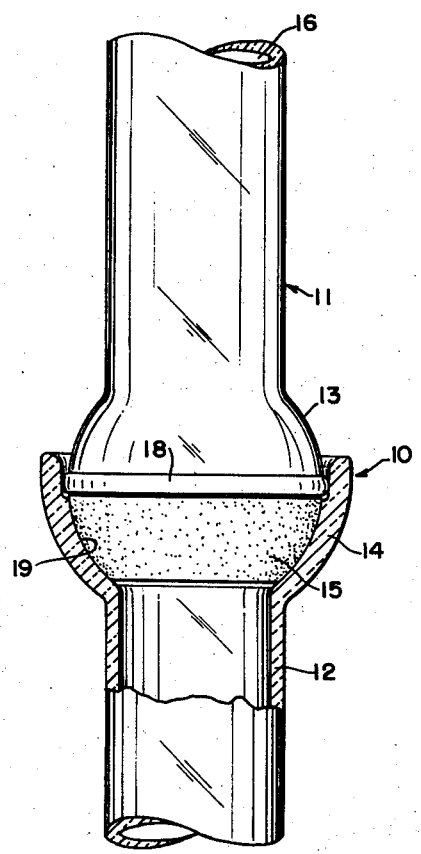
FIG. 1 is a view in elevation with parts broken away of a ball and socket joint embodying the invention.

The joint 10 shown in FIG. 1 is for connecting a pair of tubular glass elements 11, 12 and it includes an enlargement 13 on the end of the element 11, which is generally of ball form and is received within a socket 14 on the end of the element 12. The outer part of the ball or male member is formed with a surface 15 of spherical curvature and of the shape of a hemisphere except for being cut off at the end of the member because of the passage 16 through the element 11 and its enlargement 13. The surface 15 is ground and, at the inner edge or equator of the surface, the enlargement is formed with a circumferential groove 17, within which is received an O-ring 18 of a suitable resilient material, such as natural or synthetic rubber. The side walls of the groove preferably converge slightly toward the bottom and the O-ring is seated on the bottom and is under tension. The width of the groove is slightly greater than the diameter of the cross-section of the O-ring and the depth of the groove is less than that diameter, so that the O-ring projects out of the groove and is free to expand laterally as radial pressure is applied to it. Inwardly beyond the groove, the surface of the enlargement is smooth. Throughout this description and in the claims the term "smooth" is to be understood as having its conventional meaning in the glass working art, that is, a smooth surface is one having the characteristics of a heat-glazed glass surface as distinguished from a ground glass surface which has a more or less opaque and diffusing or frosted-like appearance and which, as pointed out above, is irregular and rough due to minute "hills and valleys" in the surface.

The female or socket member 14 is formed with an internal ground surface 19 of truncated hemispherical form and of a shape to mate with the surface 15. The outer end of the surface 19 lies inward from the outer end of the member 14 a distance substantially greater than the diameter of a cross-section of the O-ring and the inner surface 20 of the member between its outer end and the outer end of the ground surface 16 is smooth. The part 20a of the surface 20 lying adjacent to the outer edge of the ground surface 19 is of less diameter than the overall diameter of the O-ring 18 when seated in the groove 17 and the surface 20 increases in diameter outwardly with its outer part 20b having a diameter greater than the overall diameter of the O-ring seated in the groove.

In assembling the joint, the male and female members are telescoped over one another and, in the initial stage of the telescoping movement, the outer part 20b of the surface 20 moves past the O-ring 18 without making contact therewith. As the ground surfaces of the members move toward engagement, the inner part 20a of the surface 20 bears against the O-ring and gradually compresses it so that it expands laterally in the groove. When the ground surfaces of the members are in tight contact, the O-ring has been flattened so as to make contact with the surface 20 over a zone of substantial width. At the same time, the inner surface of the O-ring has made a tight contact with substantially the entire bottom of the groove 17. The contact of the surface 20 with the O-ring producing the deformation of the latter effects a seal which supplements the seal provided by the engagement of the ground surfaces and the total sealing effect of the completed joint is adequate for operation at a high vacuum. When the joint is to be disassembled, the members 11 and 12 are separated and, as the members move apart, the surface 20 gradually becomes freed from the O-ring so that the latter returns to its original condition.

In putting the joint together and taking it apart, the O-ring does not come into contact with the ground surface 19 in the female member 14; instead, the ring is engaged only by the smooth surface 20 outwardly from the ground surface 19. As a result, there is little wear on the O-ring when the joint is put together and taken apart, such as would occur if the O-ring were caused to move in contact with a ground surface.

Figure 3:
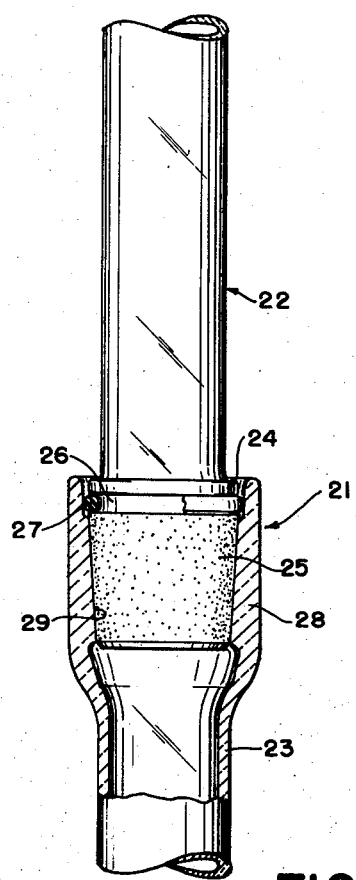
FIG. 3 is a view similar to FIG. 1 of a tapered joint embodying the invention.
Figure 2:
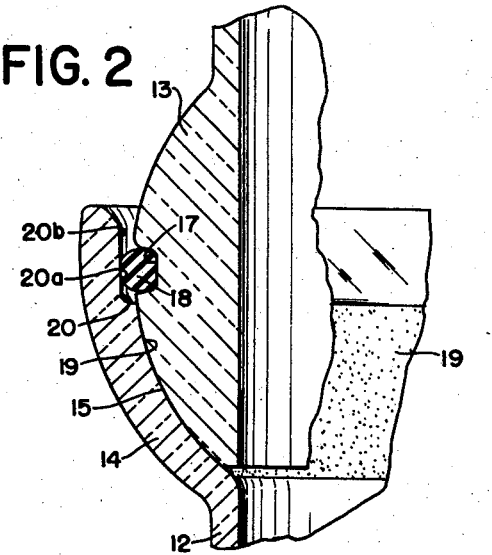
FIG. 2 is a fragmentary longitudinal view of the joint of FIG. 1 on an enlarged scale.
Figure 4:
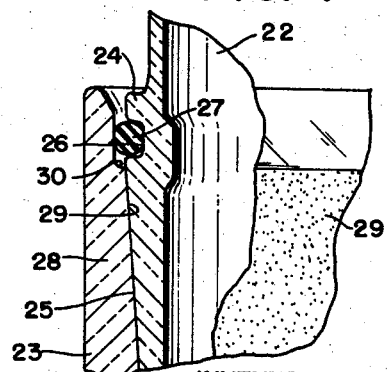
FIG. 4 is a fragmentary longitudinal view of the joint of FIG. 3 on an enlarged scale.

The joint 21 shown in FIGS. 3 and 4 is used for the purpose of connecting tubular elements 22 and 23. At its end, the element 22 is formed with an enlargement 24 which serves as the male member of the joint and is provided with a ground surface 25 tapering in diameter toward the end of the member. Inward from the ground surface, the member 24 is formed with a circumferential groove 26, in which is seated an O-ring 27 of resilient material. The groove 26 is similar in configuration to the groove 17 in the member 13 and the O-ring 27 projects out of the groove 26 as described in connection with the O-ring 18.

The element 23 of the joint 21 has an enlargement 28 serving as the female member of the joint and formed with an internal ground surface 29 of a shape to mate with the tapered surface 25. Outwardly beyond the surface 29, the inner surface 30 of the enlargement 28 is smooth and it has an inner part which is of less diameter and an outer part which is of greater diameter than the overall diameter of the O-ring when seated in the channel.

In the assembly of the joint shown in FIGS. 3 and 4, the male and female members are telescoped together and, in the initial part of such movement, the smooth surface 30 passes over the O-ring without making contact therewith. As the ground surfaces come close to engagement, the surface 30 begins to bear against the O-ring 27 and compress it. This action continues until the surfaces 25 and 29 are in contact at which point the maximum compression of the O-ring occurs. In such compression, the O-ring is flattened to increase its contact with the surface 30 and with the bottom of the groove and the deformed O-ring forms a tight seal which supplements that provided by the engagement of the ground surfaces. When the joint is to be taken apart, the elements 22 and 23 are moved to separate the ground surfaces and, in such movement, the surface 30 slides over the O-ring until it loses contact therewith, whereupon the O-ring resumes its original condition. In the assembling and disassembling of the joint, the O-ring never makes contact with a ground surface so that the O-ring is subjected to little wear.

While the joints illustrated and described include male and female members both made of glass, it is to be understood that both members may be made of metal or either one may be made of metal and the other of glass. Members of metal may differ slightly from those of glass but include the ground surfaces with the groove and the O-ring of the construction above described.

I claim:

1. A joint, which comprises a male member having an external ground surface lying adjacent to one end of the member and of the shape of a surface of revolution decreasing in diameter from its inner end to its outer end, and a circumferential groove at the inner end of the surface, a resilient O-ring seated on the bottom of the groove and projecting out of the groove, the groove being wider than the diameter of the cross-section of the O-ring, and a female member having an internal ground surface spaced inwardly from the end of the member and of a shape to mate with the ground surface of the male member, the internal surface of the female member outwardly from the outer end of the ground surface being smooth and being in part of less and in part of greater diameter than the overall diameter of the O-ring seated in the groove.

2. The joint of claim 1, in which the ground surfaces are zones of hemispheres and the equatorial plane of the male member lies within the groove.

3. The joint of claim 1, in which the part of the internal surface of the female member which is of less diameter than the overall diameter of the O-ring seated in the groove, lies adjacent to the outer end of the ground surface.

4. The joint of claim 3, in which the part of the internal surface of the female member which is of less diameter than the overall diameter of the O-ring seated on the groove, has an axial length greater than the diameter of the cross-section of the O-ring.

5. The joint of claim 1, in which the ground surfaces are frusto-conical.

References Cited in the file of this patent

UNITED STATES PATENTS

| 2,190,220 | Schilling | Feb. 13, 1940 |
| 2,946,606 | Smith | July 26, 1960 |